United States Patent
Greathouse

(10) Patent No.: US 7,780,298 B2
(45) Date of Patent: Aug. 24, 2010

(54) EXTENDERS FOR MOTORCYCLE MIRRORS

(76) Inventor: Richard Greathouse, 104 N. California, Sheridan, IN (US) 46069

( * ) Notice: Subject to any disclaimer, the term of this patent is extended or adjusted under 35 U.S.C. 154(b) by 0 days.

(21) Appl. No.: 11/840,565

(22) Filed: Aug. 17, 2007

(65) Prior Publication Data

US 2009/0046383 A1 Feb. 19, 2009

(51) Int. Cl.
*B60R 1/078* (2006.01)
*A47G 1/16* (2006.01)

(52) U.S. Cl. .................... 359/842; 248/475.1

(58) Field of Classification Search ........... 359/842, 359/844, 875; 248/475.1
See application file for complete search history.

(56) References Cited

U.S. PATENT DOCUMENTS

| | | | | |
|---|---|---|---|---|
| 4,252,290 A | * | 2/1981 | Willey | 248/549 |
| 4,759,620 A | * | 7/1988 | Sakuma et al. | 359/841 |
| 4,776,624 A | * | 10/1988 | Sakuma et al. | 296/1.11 |
| 4,793,582 A | * | 12/1988 | Bronstein et al. | 248/486 |
| 4,854,539 A | * | 8/1989 | Glue | 248/479 |
| 5,073,019 A | * | 12/1991 | Ferreira do Espirito Santo | 359/872 |
| D406,088 S | * | 2/1999 | Hanlon et al. | D12/187 |
| 6,070,846 A | * | 6/2000 | Shimokobe et al. | 248/475.1 |
| 6,764,056 B1 | * | 7/2004 | Wu | 248/480 |
| 6,834,972 B1 | * | 12/2004 | Medimurec | 359/872 |
| 7,007,904 B2 | * | 3/2006 | Schultz | 248/230.1 |
| 2002/0067557 A1 | * | 6/2002 | Coleburn | 359/842 |
| 2003/0142422 A1 | * | 7/2003 | Spitzer et al. | 359/842 |
| 2004/0135054 A1 | * | 7/2004 | De Leon | 248/475.1 |
| 2005/0237643 A1 | * | 10/2005 | Wu | 359/871 |

FOREIGN PATENT DOCUMENTS

| | | | | |
|---|---|---|---|---|
| DE | 10235886 A1 | * | 3/2003 | |
| EP | 1464570 A1 | * | 10/2004 | |
| FR | 2362025 A | * | 4/1978 | |
| JP | 58049538 A | * | 3/1983 | |
| JP | 06263073 A | * | 9/1994 | |
| JP | 11245872 A | * | 9/1999 | |
| TW | 130029 A | * | 1/1990 | |

OTHER PUBLICATIONS

Dale Walker's Holeshot Perfomance, Feb. 27, 2004 (date obtained from Internet <URL:www.achive.com>), [online], [retrieved on Jun. 23, 2009] Retrieved from the Internet <URL: http://www.holeshot.com/sv650/mirrorextenders.html>.*

Dale Walker's Holeshot Perfomance, Feb. 27, 2004 (date obtained from Internet <URL: http://www.archive.com>), [online], [retrieved on Jun. 23, 2009] Retrieved from the Internet <URL: http://www.holeshot.com/sv650/mirrorextenders.html>.*

(Continued)

*Primary Examiner*—Alessandro Amari
*Assistant Examiner*—Mark Consilvio

(57) ABSTRACT

Extenders are provided that can be mounted on the existing rearview mirror mounting hole of motorcycle handlebars to provide a new mounting hole for the rearview mirrors that is laterally spaced from the original hole. The extenders allow the stock mirrors to be positioned for greater visibility without causing undue vibration in the mirror. The extenders can be constructed with a blind hole that allows for a clean and visually appealing installation. The extenders can also be constructed with spaced apart arms that define a hole. The hole can serve to reduce wind drag, reduce construction costs or function as a place for mounting things to the motorcycle.

19 Claims, 3 Drawing Sheets

OTHER PUBLICATIONS

Fatbook 2006 (Drag Specialties), May 31, 2006 (date obtained from Internet <URL: http://web.archive.org/web/*/http:/www.powersportsnetwork.com/enthusiasts/catalog_detail.asp?catalog=2269>), [online], [retrieved on Aug. 16, 2009] Retrieved from the Internet <URL: http://www.powersportsnetwork.com/enthusiasts/catalog_detail.asp?catalog=2269>.*

* cited by examiner

EXTENDERS FOR MOTORCYCLE MIRRORS

TECHNICAL FIELD

The present invention is generally related to extenders for motorcycle mirrors. More particularly, but not exclusively, is related to extenders and a kit thereof that can be used to extend the stock review mirrors of a motorcycle laterally to allow the rider greater visibility without increasing the vibration in the mirror.

BACKGROUND

Motorcycle rearview mirrors typically include a mirror mounted at the end of a rigid stem. The mirror is typically mounted on the rigid stem in a ball and socket arrangement, which allows the angular position of the mirror to be adjusted by the rider. The other end of the rigid stem is typically mounted to the handlebars in a relatively fixed orientation. For example, in most cruiser style bikes (e.g. a Harley Davidson FAT BOY®) the mirror stem includes a 5/16 inch threaded post that is inserted through a mounting hole on the handlebars. This mounting hole for the mirror stem is typically located just inside the hand grips and adjacent the brake reservoir. The threaded post of the mirror stem extends through the mounting hole and is secured on the underside of the handlebars by an acorn nut and washer.

Certain riders, particularly those with broader shoulders, sometimes find that the stock mirrors are not positioned far enough laterally to provide an adequate view around the rider. Accordingly, aftermarket mirrors are available which have longer and/or different stems designed to provide better placement of the mirrors. However, due to their length, these types of replacement mirrors can be more susceptible to excessive vibrations. Likewise, this approach can be costly because the entire mirror assembly is replaced. Accordingly, there is a need for a mechanism for laterally extending the rearview mirrors of a motorcycle that can be used with stock rearview mirrors. The present invention addresses this need and, in one form, provides extenders for stock mirrors that are attractive, inexpensive, and easy to install.

BRIEF DESCRIPTION OF THE FIGURES

Although the characteristic features of this invention will be particularly pointed out in the claims, the invention itself, and the manner in which it may be made and used, may be better understood by referring to the following description taken in connection with the accompanying figures forming a part thereof.

DESCRIPTION OF THE ILLUSTRATED EMBODIMENTS

Figure 1:
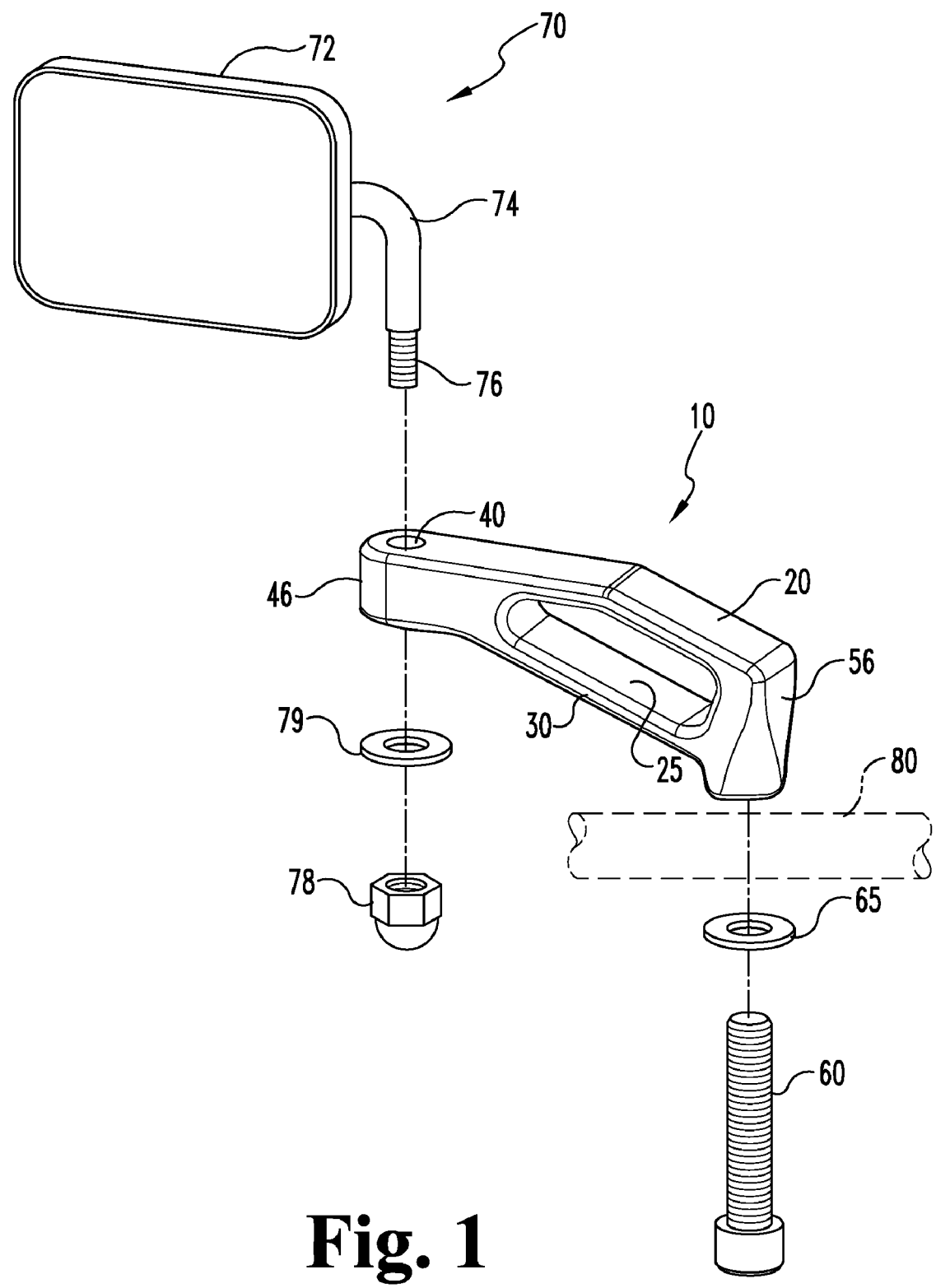
FIG. 1 is an exploded view showing the attachment of a rearview mirror and an extender to the handlebars of a motorcycle.
Figure 2:
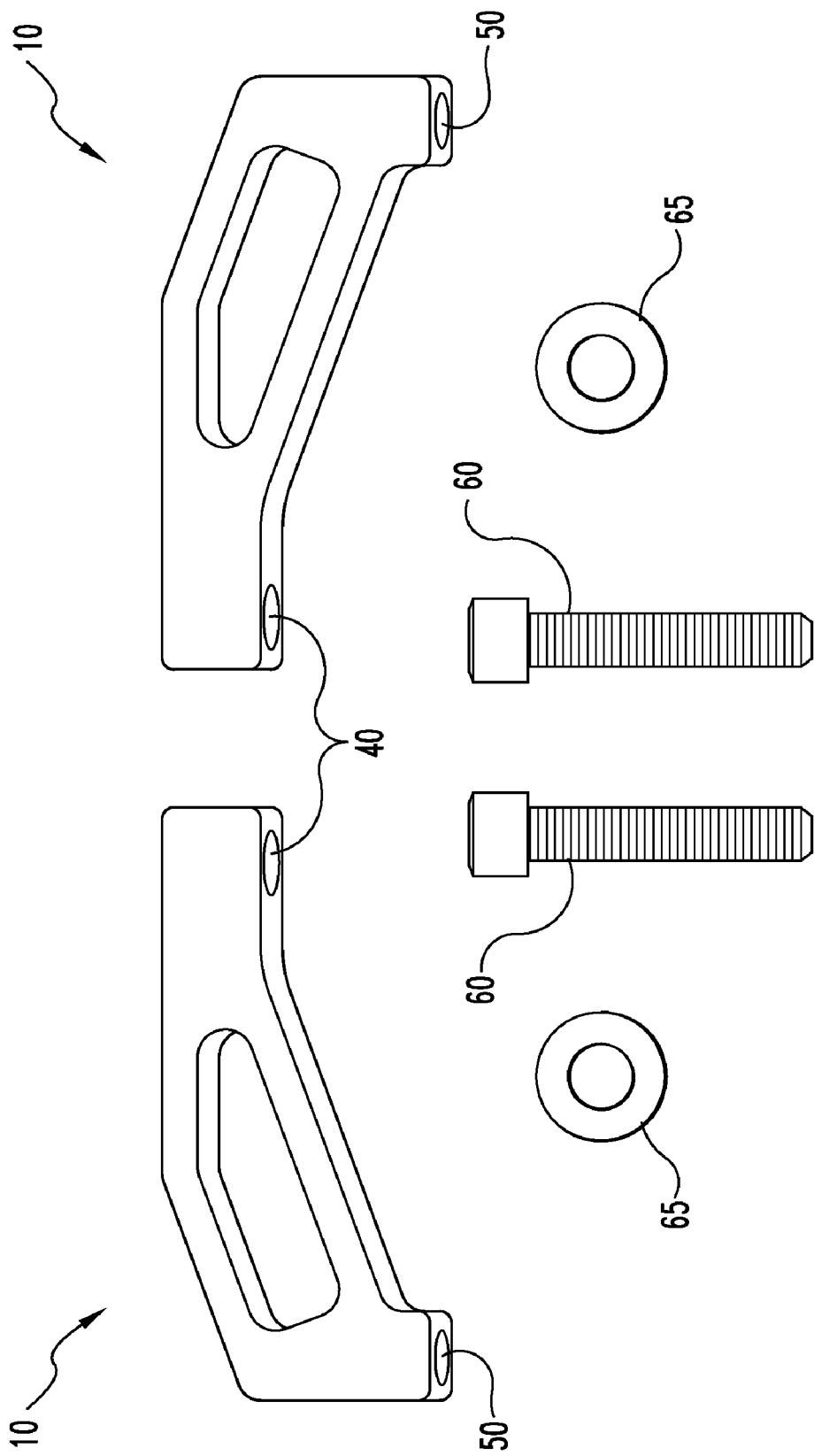
FIG. 2 is a view of an exemplary kit comprising two extenders and connectors for use with stock rearview mirrors.
Figure 3:
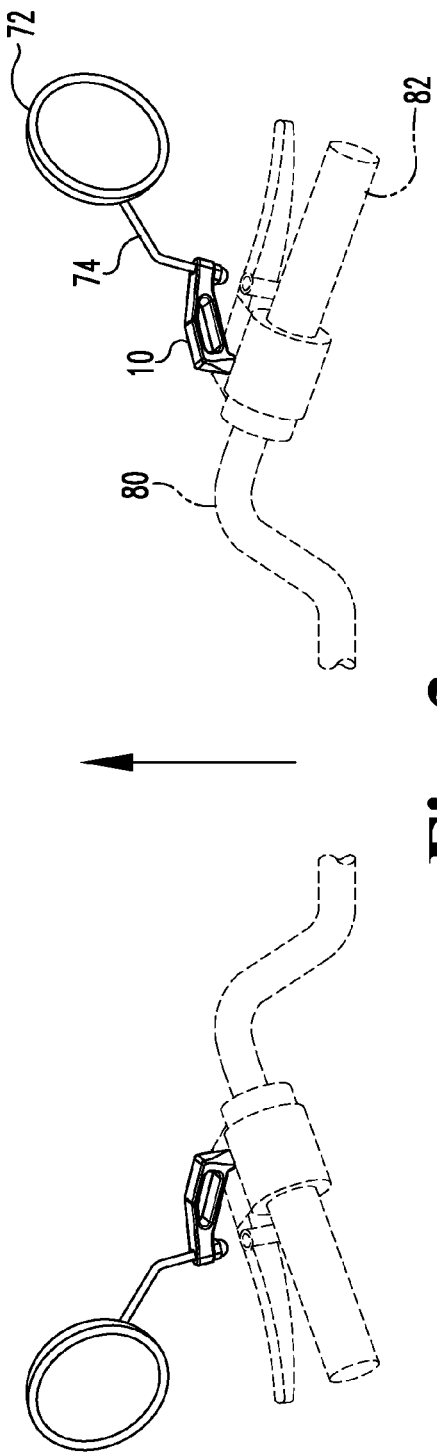
FIG. 3 is a view of the FIG. 2 kit installed on a motorcycle.

For the purposes of promoting an understanding of the principles of the invention, reference will now be made to the embodiments illustrated in the drawings and specific language will be used to describe the same. It will nevertheless be understood that no limitation of the scope of the invention is hereby intended. Alterations and further modifications in the illustrated devices, and such further applications of the principles of the invention as illustrated herein are contemplated as would normally occur to one skilled in the art to which the invention relates.

According to one aspect, the present invention provides extenders that can be mounted on the existing rearview mirror mounting hole of motorcycle handlebars to provide a new mounting hole laterally spaced from the original hole. With reference to FIGS. 1-4, extender 10 is a rigid body that defines first and second body portions 56, 46 connected by upper and lower spaced apart rigid arms 20, 30. First body portion 56 is adapted to be secured to the existing rearview mirror mounting hole (not shown) on a motorcycle's handlebars after the existing mirror stem has been removed. Such existing mounting holes are conventionally provided as an unthreaded through hole on a portion of the handlebars just inside the handgrips 82, for example as a part of the hand grip assembly that contains the pivot for the hand levers (e.g. clutch or brake), the brake reservoir, and/or certain control buttons (e.g. turn signal).

In the illustrated embodiment, first body portion 56 is configured to be mounted on the top side of the existing mounting hole in a manner that is clean and visually appealing. Body portion 56 defines a blind threaded hole 50 that receives a mounting bolt 60 that is passed upwardly through the existing mounting hole on the handlebars. The mounting bolt is sized to pass through the existing mirror mounting hole and may be, for example, a 1.5 by 5/16 inch threaded bolt. Lock washer 65 and/or an epoxy (e.g. locktite) may be used to assure a secure connection of the extender 10 onto the existing mirror mounting hole.

Second body portion 46 includes a through hole 40 configured to receive the mounting stem 74 of a conventional motorcycle rearview mirror assembly 70, such as the stock mirror 72 and stem 74 that came with the motorcycle. Hole 40 may be an unthreaded hole of a diameter consistent with the existing mirror mounting hole on the handlebars, for example 0.33 inches. Threads 76 on the end of mirror post 74 extend through receiving hole 40 until a shoulder on post 74 abuts the top perimeter of hole 40. Any excess length of threads 76 may be cut off and an acorn nut 78 and lock washer 79 may be used to complete the connection of the rearview mirror 72 to the motorcycle.

Extender 10 is designed such that upper and lower arms 20, 30 rigidly connect first and second body portions 46, 56 and define an opening 25. The provision of opening 25 can serve to reduce the amount of material that otherwise would be required to construct extender 10. Opening can also allow air flow through the extender, which can reduce wind drag.

Opening 25 can also serve as a mounting location for items that the rider may wish to attach to the motorcycle. Such items can be useful items, such as a key ring, or things that are primarily decorative, such as chrome emblems. For example a ring can be inserted through opening 25 and used to hold one or more such items. Alternatively or in addition, certain items (such as decorative emblems) can be designed to be securely mounted for display in the space between arms 20, 30.

Each of mounting holes 40, 50 of extender 10 define a respective mounting axis 42, 52. It is to be appreciated that, when extender 10 is mounted on an existing mounting hole as described above, axis 52 is aligned with the mounting axis of the existing mounting hole (not shown). In the illustrated embodiment, axis 42 of mounting hole 40 is generally parallel to axis 52, and consequently the axis of the original mounting hole in the handlebars. Non parallel arrangements of axes 42 and 52 are also contemplated, for example where axes 42, 52 are offset from parallel by about 15°, by about 30°, or by greater than 30°.

Figure 4:
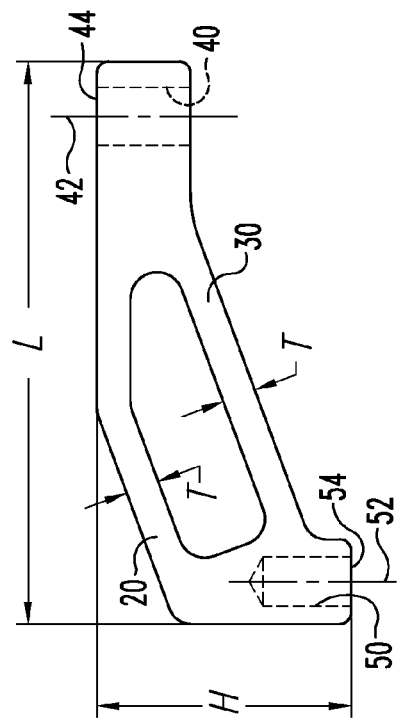
FIG. 4 is a detailed view of an extender from the FIG. 2 kit.

It has been found that extender 10 is particularly effective when its length L is between about 2 and 4 inches, for example about 3.2 inches. As shown in FIG. 4, this length is measured from the ends of the extender 10 where the centerline of each hole 40, 50 is near the respective end, for example within about ¼ inch of the end. The height H of extender 10, which is measured from the top face 44 of hole 40 and the bottom face 54 of hole 50, may generally range from 1 to 3 inches, for example being about 1.5 inches. In other configurations, the dimensions for extender 10 are preferably selected such that mounting hole 40 is spaced 2 to 3 inches from axis 52 of hole 50, or vice versa.

Extender 10 may be constructed from a single piece of rigid material, such as a metal or metal alloy, using any conventional manufacturing technique. In a preferred form, extender 10 is machined from aircraft aluminum. This construction of extender 10 has been found to provide sufficient rigidity for the extenders 10 to avoid transmitting undesirable vibrations even when the thickness T of the arms (per FIG. 4) is only about 0.2 inches. In a still further preferred form, the extenders are polished in show chrome, which serves to increase their appeal to certain motorcycle enthusiasts.

While the invention has been illustrated and described in detail in the drawings and foregoing description, the same is to be considered as illustrative and not restrictive in character. Only certain embodiments have been shown and described, and all changes, equivalents, and modifications that come within the spirit of the invention described herein are desired to be protected. Thus, the specifics of this description and the attached drawings should not be interpreted to limit the scope of this invention to the specifics thereof. Rather, the scope of this invention should be evaluated with reference to the claims appended hereto. In reading the claims it is intended that when words such as "a", "an", "at least one", and "at least a portion" are used there is no intention to limit the claims to only one item unless specifically stated to the contrary in the claims. Further, when the language "at least a portion" and/or "a portion" is used, the claims may include a portion and/or the entire items unless specifically stated to the contrary.

What is claimed is:

1. A method for laterally extending the rearview mirror of a motorcycle comprising:
   providing a motorcycle having a rearview mirror mounted on the handlebars and providing a rigid extension member for laterally extending the rearview mirror, wherein the extension member is a unitary piece of rigid material including a first portion spaced from a second portion by upper and lower rigid arms;
   removing the mirror stem of the rearview mirror from the original mounting hole on the handlebars;
   inserting a threaded mounting member upwardly through the original mounting hole;
   coupling the rigid extension member to the original mounting hole by screwing the threaded mounting member into a blind opening in the first portion of the extension member, the blind opening defining a first axis; and
   inserting the mirror stem into a through receiving hole in the second portion of the extension member, the receiving hole defining a second axis laterally spaced from the first axis
   wherein the extension member has a length that is at least ⅓ greater than its height such that the mirror stem is spaced laterally from the original mounting hole a greater distance than it is raised above the original mounting hole.

2. The method of claim 1 wherein the arms are non-symetrical such that the opening therebetween is asymmetrical.

3. The method of claim 2 wherein the upper arm is angled and the lower arm is straight.

4. The method of claim 1 wherein the first and second axes are within about 30° of parallel.

5. The method of claim 1 wherein the first and second axes are within about 15° of parallel and wherein the extension member has a length between 3 and 4 inches and a height between 1 and 3 inches.

6. The method of claim 1 wherein at least a portion of the receiving hole is at least 2 inches from the first axis.

7. The method of claim 1 wherein at least a portion of the blind opening is at least 2 inches from the second axis.

8. A rearview mirror system for a motorcycle comprising:
   a rearview mirror having a stem, wherein the stem has an end configured to be mounted in a mounting hole on handlebars of the motorcycle;
   a rigid extension member configured to provide mounting hole for the rearview mirror stem that is laterally spaced from the mounting hole for the stem that is positioned on the handlebars, the extension member defining a first body portion defining a threaded blind hole, a second body portion defining an unthreaded through receiving hole, and first and second spaced apart arms rigidly coupling the first and second body portions and defining an opening therebetween, wherein the extension member is a unitary piece of rigid material having a length that is at least ⅓ greater than its height; and
   a threaded connector positioned in the mounting hole on the handlebars of the motorcycle and securing the first body portion to the handlebars of the motorcycle via the blind hole;
   wherein the rearview mirror stem is mounted in the unthreaded through receiving hole in the second body portion.

9. The system of claim 8 wherein the holes in the first and second body portions define axes that are within about 30° of parallel.

10. The system of claim 9 wherein the axes are within about 15° of parallel.

11. The system of claim 8 wherein the opening serves as a mounting opening for attaching things to the motorcycle.

12. The system of claim 8 wherein the arms are spaced apart vertically and the upper arm is angled.

13. The system of claim 8 wherein the arms are non-symetrical such that the opening therebetween is asymmetrical.

14. The system of claim 13 wherein one arm is angled and the other arm is straight.

15. A kit for extending the stock mirrors of a motorcycle comprising:
   at least two rigid mirror extenders and at least two threaded bolts having 5/16 inch threads;
   wherein each of the extenders are unitary pieces of metal configured to provide a mounting hole for the stem of a rearview mirror that is laterally spaced from the mounting hole for the rearview mirror stem that is positioned on the handlebars and include:
      a first body portion defining a blind threaded hole for attachment to the existing mirror mounting hole of a motorcycle via one of the threaded bolts;

a second body portion defining an unthreaded through receiving hole adapted to receive the stem of a motorcycle mirror; and first and second spaced apart arms rigidly coupling the first and second body portions and defining an opening therebetween:

wherein the holes in the extenders define axes that are within about 30° of parallel and wherein each extender has a length that is at least ⅓ greater that its height.

16. The kit of claim 15 wherein each of the extenders are finished in polished chrome.

17. The kit of claim 15 wherein each extender has a length between 3 and 4 inches and a height between 1 and 3 inches.

18. The kit of claim 15 wherein the arms are non-symetrical such that the opening therebetween is asymmetrical.

19. The kit of claim 18 wherein the upper arm is angled and the lower arm is straight.

* * * * *